United States Patent
Mitchell

(10) Patent No.: US 7,761,793 B1
(45) Date of Patent: Jul. 20, 2010

(54) SATCOM DATA COMPRESSION SYSTEM AND METHOD

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 884 days.

(21) Appl. No.: 11/190,593

(22) Filed: Jul. 27, 2005

(51) Int. Cl.
*G06N 3/00* (2006.01)
(52) U.S. Cl. .................................................... 715/277
(58) Field of Classification Search ................ 715/234, 715/242, 277
See application file for complete search history.

(56) References Cited

U.S. PATENT DOCUMENTS

| | | | |
|---|---|---|---|
| 5,959,560 A * | 9/1999 | Said et al. .................... | 341/107 |
| 2004/0064588 A1* | 4/2004 | Jungck ........................ | 709/247 |
| 2005/0041859 A1* | 2/2005 | Nguyen et al. ............... | 382/173 |
| 2005/0083358 A1* | 4/2005 | Lapstun et al. ................ | 347/5 |
| 2005/0215238 A1* | 9/2005 | Macaluso ................ | 455/414.1 |
| 2005/0244060 A1* | 11/2005 | Nagarajan et al. ........... | 382/232 |
| 2006/0115164 A1* | 6/2006 | Cooley ........................ | 382/232 |

OTHER PUBLICATIONS

Marpe et al., "A Two-Layered Wavelet-Based Algorithm for Efficient Lossless and Lossy Image Compression," Apr. 2000, IEEE, pp. 1094-1102.*

"Gunzip(1)—Linux man page," Copyright 2002, Free Software Foundation, Inc., pp. 1-7.*

US Patent Application for "System and Method for Compression of Words and Phrases in Text based on Language Features" by James P. Mitchell, U.S. Appl. No. 10/824,923, filed Apr. 15, 2004.

US Patent Application for "System and Method for Real Time Textual Data Compression and Textual Data Manipulation Using Unique Numerical Identification of Entire Words" by James P. Mitchell, U.S. Appl. No. 09/660,013, filed Sep. 12, 2000.

* cited by examiner

*Primary Examiner*—Kyle R Stork
(74) *Attorney, Agent, or Firm*—Matthew J. Evans; Daniel M. Barbieri

(57) ABSTRACT

A method of data compression for compressing a web page with graphics files, text files, JAVA scripts, and HTML files comprises storing the graphics files, the text files, the JAVA scripts, and the HTML files in a temporary directory. The graphics files are sorted into lossless and lossy file groups. The lossy files, the lossless files, the text files, the JAVA scripts, and the HTML files are concatenating and then compressed to yield a compressed web page. The lossy files may be de-featured and transcoded before concatenation. The lossless files may be subsampled or decimated before concatenation to match client display size. Lossy files may be de-featured to match client display size by subsampling and reducing image fidelity. Optimal file concatenation size range is determined to optimally develop compression performance while minimizing latency. The concatenated file size is regulated to the optimal file concatenation size.

19 Claims, 2 Drawing Sheets

SATCOM DATA COMPRESSION SYSTEM AND METHOD

CROSS REFERENCE TO RELATED APPLICATIONS

The present application is related to co-pending application Ser. No. 10/824,923 entitled "System and Method for Compression of Words and Phrases in Text based on Language Features" by James P. Mitchell filed on Apr. 15, 2004 and Ser. No. 09/660,013 entitled "System and Method for Real Time Textual Data Compression and Textual Data Manipulation Using Unique Numerical Identification of Entire Words" by James P. Mitchell filed on Sep. 12, 2000. The co-pending applications are incorporated by reference and are assigned to the assignee of the present invention.

BACKGROUND OF THE INVENTION

The present invention relates to communications systems, satellite communications (SATCOM) systems, and specifically to a system and method for increasing data rate in a SATCOM communications system.

SATCOM users are demanding broadband capability through their global SATCOM systems. Customers are requesting effective data rates equivalent to DSL (digital subscriber line). Furthermore broadband satellites including Ku, Ku/Ka, and Ka, are beginning to enable air-to-ground links supporting these options as well. Current SATCOM radios with spot beam capability can deliver data rates of 64 kbps. By compressing all data an average effective rate of 128 kbps and greater can be achieved. Further by placing two radio systems together in tandem, a desired nominal rate of 512 kbps can be achieved, leading to more satisfied customers.

SATCOM systems are also used to enable aircraft-to-ground communications. SATCOM is an inherently expensive method due to the high costs associated with satellite construction, launch, maintenance and control. Satellite air-ground-air communications systems are none the less preferred as a communications method and as a global system solution due to lack of other global options. The growing need for two-way broadband connectivity from aircraft-to-ground is demanding lower cost connectivity. Current SATCOM systems range from $3 to $10 per minute making casual or even business Internet and e-mail costly, slowing the rate of adoption and use of systems.

Graphical files make up a large segment of the data file traffic while browsing the Internet. Web downloads with graphics have the potential to slow download time, increase cost and reduce the total number of users served by a system with limited bandwidth resources. There is a need to significantly reduce graphical file sizes where possible through compression and other novel techniques that will maintain high-fidelity image reproduction when presented at the destination. Any system solution must handle and respond to lossless and lossy file classes accordingly, maintaining integrity for intended use.

Thus there is a need for lower cost more affordable aircraft connectivity with a compression system and method capable of converting average web page data and traffic by a compression method capable of further reducing files by up to 2× or greater.

SUMMARY OF THE INVENTION

A method of data compression for compressing a web page is disclosed. The method comprises the steps of storing the web page having graphics files, text files, JAVA scripts, and HTML files in a temporary directory. The graphics files are sorted into lossless files and lossy files. The lossless files may be decimated and the lossy files may be de-featured. The de-featured lossy files may be transcoded. The transcoded and de-featured lossy files, the decimated lossless files, the text files, JAVA scripts, and the HTML files are all concatenated and then compressed in a final compression process to yield a compressed web page.

The method of data compression for compressing a web page further comprises obtaining the HTML files from the temporary directory, scanning the HTML files for graphics file references, and enabling concatenating when the graphic files cease accumulating in the temporary directory as indicated by the graphic file references. Concatenation is enabled when the graphic files cease accumulating in the temporary directory after a preset time or when some percentage of the files is delivered from the Internet.

The step of decimating the lossless files comprises reducing a graphic image size to match a size and resolution of a client display. The client display size and resolution is communicated and the lossless files are reprocessed to a reduced resolution while maintaining an original graphic size and aspect ratio for accurate size presentation to the client display. Any unnecessary data associated with the graphic image not visible on the client display is removed.

The step of de-featuring the lossy files further comprises communicating a client display size and display resolution and reducing image fidelity of the lossy files according to the display size. Image fidelity is reduced by reducing chroma and luminance fidelity. De-featuring may also include decimating the lossy files to reduce a graphic image size to match a size of the client display.

Transcoding the lossy files comprise converting an existing discrete cosine transform (JPEG) image to a wavelet (JPEG2000) image.

The method of data compression for compressing a web page further comprises the steps of determining an optimal file concatenation size to optimize compression and minimize latency and regulating concatenated file size to the optimal file concatenation size.

It is an object of the present invention to provide increased data rate through a air-to-ground communications system.

It is an object of the present invention to provide a unique real-time process for reducing commercially compressed graphical content.

It is an advantage of the present invention to provide the ability to save time and money over existing SATCOM links.

It is an advantage of the present invention to provide increased data entropy thereby improving compressibility.

It is an advantage of the present invention to provide increased compression capability for web pages.

It is a feature of the present invention to offer a concatenation process for each class of graphical file (lossless and lossy) after its optional reduction pre-process.

It is a feature of the present invention to concatenate each file from within each single web page download.

It is a feature of the present invention to offer collective file compression beyond that of files already individually in a compressed state.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for a system and method for efficiently compressing and transferring data through a satellite communications (SATCOM) system. The novel compression process provides further reduction of files compressed using graphics file compression methods in present use in digital communications.

The efficiency of JPEG and GIF file encoding is very high. These compression techniques along with Huffman encoding leave almost nothing to improve upon in terms of follow-on compression techniques of graphics images on a per file basis. Novel methods specific to an aircraft scenario and leveraging COTS (commercial off-the-shelf) algorithms are introduced in this invention to achieve an average of 2× or greater improvement in data compression.

Figure 1:
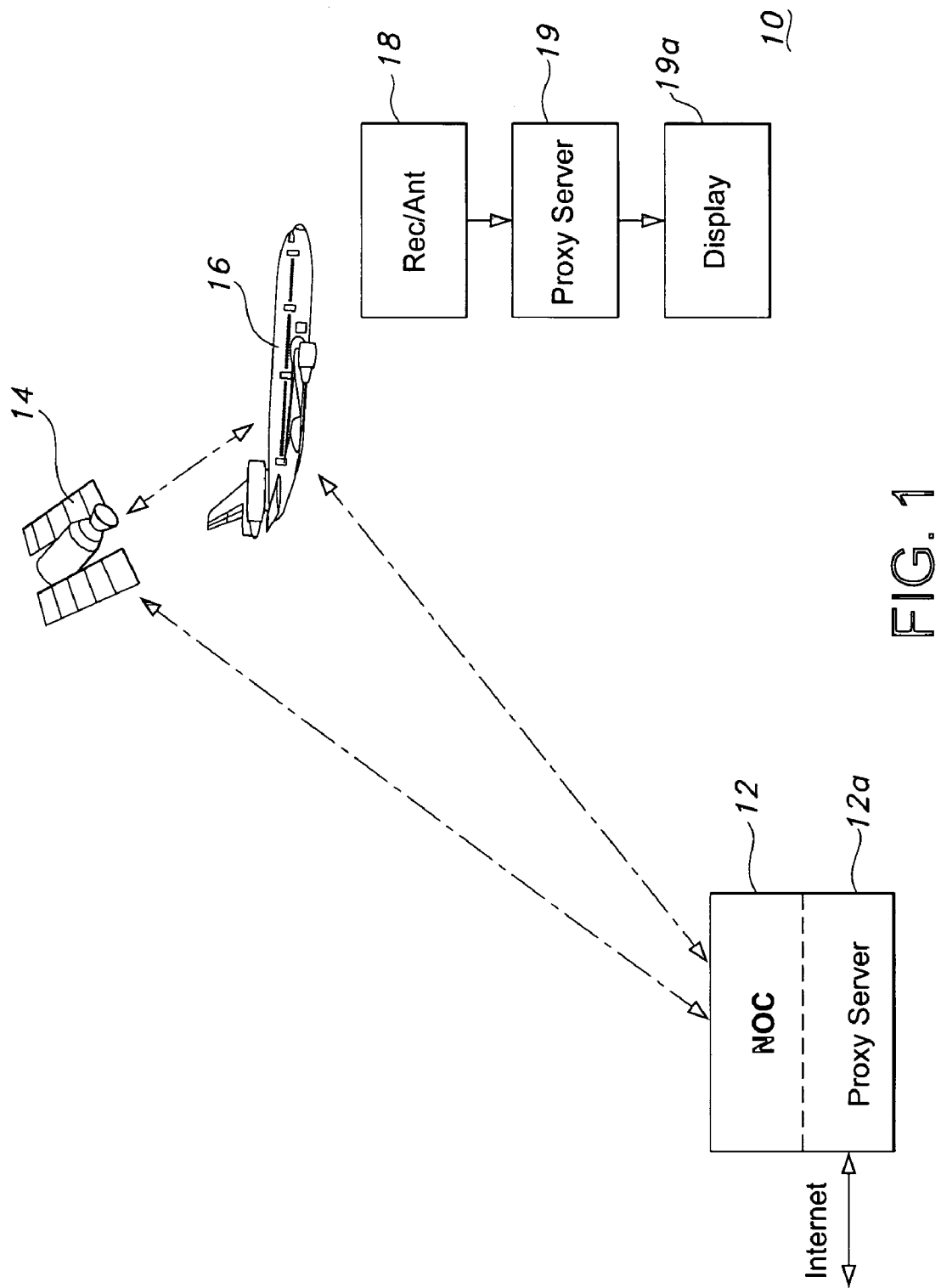
FIG. 1 shows a communications system that may incorporate the present invention.

A communications system 10 that may incorporate the present invention is shown in FIG. 1. The communications system 10 includes a ground network operations center (NOC) 12 connected to the Internet through a proxy server 12a in the NOC 12. The NOC 12 communicates through a satellite 14 to an aircraft 16. The communications system 10 may also be a direct-to-ground communications system eliminating the satellite 14. The aircraft 16 contains a receiver/antenna 18 for receiving signals from the satellite 14, an airborne proxy server 19, and a client display 19a. The compression process of the present invention may be installed at each end of the communications system 10, on the aircraft 16 and at the NOC 12. The compression process may be installed in the NOC proxy server 12a and the airborne proxy server 19 in FIG. 1. The proxy servers 12a and 19 may perform compression and decompression functions.

A typical web page contains about half graphics consisting of lossy (JPEG), lossless (GIF), and other image files, a substantial share of the bandwidth. The other half of the web page is text, HTML, and other file types. In aggregate, graphics, text, JAVA scripts, and HTML constitute more than 80 to 90% of typical web traffic. A compression method that is preferably lossless is needed to retain high-quality image and graphics with reductions of approximately 40% or more. This problem involves the issue of improving upon existing JPEG, GIF, and other images that are generally already Huffman encoded.

Figure 2:
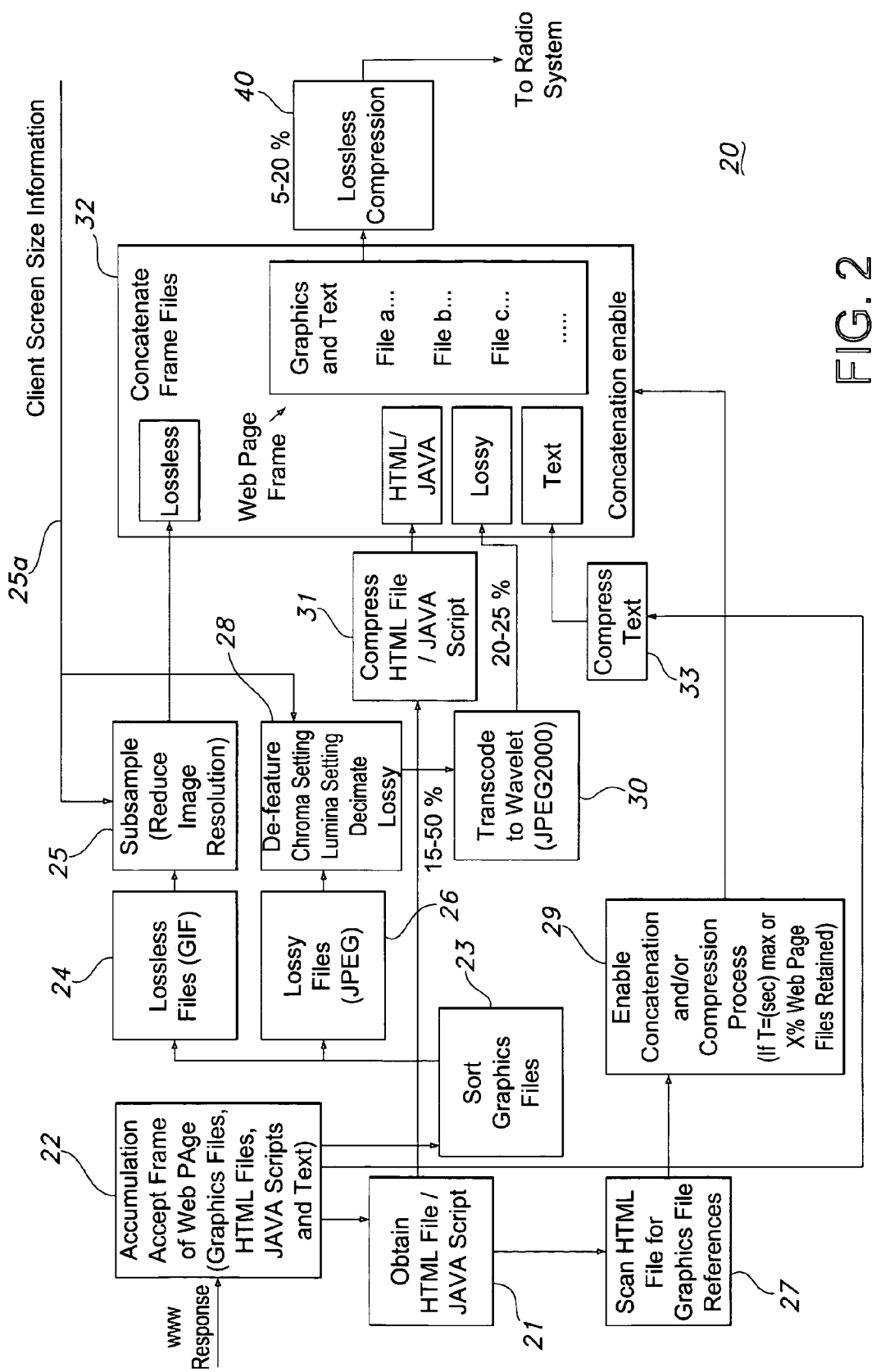
FIG. 2 is a diagram of a compression process of the present invention that may be included in the system of FIG. 1.

The compression process 20 of the present invention is shown in FIG. 2 and may be included in NOC proxy server 12a and airborne proxy server 19. The compression process 20 leverages the fact that as a client browses the web using MS Internet Explorer, Netscape or other web browser, HTML, JAVA scripts, text, graphics, and video files are transferred and accumulated in a temporary directory 22 as a page or frame of data representing what is needed to construct each unique web page, how it arrives, and how it is presented to the client. Arrival of individual files that make up a web page may not be in any particular order. During the transfer of a web page, typically graphics files GIF, JPEG, etc. arrive to a client computer's browser temporary directory 22 and the browser application then reads the web page file to present the web information on the client display 19a. This temporary storage enables the group of files to be captured prior to display or prior to forwarding on a network to a radio system and therefore the opportunity for compression is made possible within the proxy servers 12a and 19. The present invention is for a unique process for compressing graphical files captured by the temporary storage process.

The present invention is not to be confused with caching data, a different process used to reduce data traffic requiring same file listings at both the source and destination. The data caching process requires a cache of previously viewed files to be present in order to be effective. The problem with this is that much web data viewed by a single client on a business jet has low cache history. A small jet may not benefit from caching therefore compression methods are needed. The invention uses a near real-time web page graphics compression process and does not require any destination system file training or associated bandwidth required to do so.

The invention process 20 shown in FIG. 2 incorporates COTS processes including de-featuring 28 and JPEG-2000 wavelet transcoding 30, concatenation 32, and a final lossless compression step 40 to produce a combined compression process that averages about two times (2×) compression.

FIG. 2 shows the compression process 20 flow from the original file classes received from the World Wide Web (www) and accumulated and stored in the temporary directory 22. The files are sorted at 23 into lossless (GIF) graphic file groups 24 and lossy (JPEG) graphic file groups 26. The lossless files 24 are sent to a subsampling process 25 were the file data may be decimated according to a client's display size and then to a concatenation process 32. Lossy files 26 are sent to de-featuring 28, transcoding 30 to a more efficient code if applicable, and then to the concatenation process 32. The de-featuring process 28 and the transcoding process 30 are optional. HTML and JAVA script files are obtained at 21 from the temporary directory 22 and sent to the concatenation process 32. An optional HTML file/JAVA script compression process 31 using LZ, Gzip, WinZip, PK and other examples such as those disclosed in the co-pending applications and others known in the art may be performed on the HTML and JAVA script files before concatenation 32. Text files may be sent from the temporary directory 22 directly to the concatenation process 32. An optional text compression process 33 using LZ, Gzip, WinZip, PK and others known in the art may be performed on the text files before concatenation 32. When enabled the concatenation process 32 concatenates the lossless graphic files, the lossy graphics files, the text files, the JAVA script files, and the HTML files.

The HTML files obtained in process 21 from directory 22 are scanned for graphic file references 27. The scanned graphics file reference data from process 27 are used at enable process 29 to enable the concatenation process 32. The enable process 29 enables the concatenation process 32 when files cease accumulating in directory 22 as indicated by the graphic file references after a preset time, T=(sec), or when some percentage (X %) of the web page files are delivered from the www.

The concatenated files are then compressed in the final compression process 40 that may be LZ, Gzip, WinZip, PK, those disclosed in the co-pending applications, and others known in the art. Additionally, more than one process may be simultaneously tried at the output where the smallest outcome is used and delivered.

Current compression methods of graphics files do not take into account data entropy from a plurality of file sets generally associated with a single website or an e-mail. It is better to perform compression on a fused data file set than on a group of individual files or even as a batch method. The concatenation process 32 and the compression process 40 involve unifying data from various graphics files from the same website as determined by matching graphics files names to HTML files and compressing as one file using a commercial algorithm such as WinZip or Gzip. This is a lossless process that groups smaller files into larger files and re-introduces new data entropy thereby enabling a more effective compression method.

The concatenation process 32 is used to increase the data entropy of captured finite data set stored in temporary directory 22 and represented as a fixed web page and reduced by the final compression process 40. The concatenation process 32 of each class of graphical file (lossless and lossy) after its optional reduction pre-process (de-feature 28 and transcode 30), fixed or driven by a client's display size, is a unique aspect of the invention process 20.

At the NOC 12 in proxy server 12a, each file to be transmitted is attached to an identification (ID) position header. All files are fused into one in the concatenation process 32 with each data file appended to one another to make one file so the compression software uses the additional entropy. A complete web page is ideally used. A typical web page contains 100 or more files including JPEG, GIF, and other graphics files. Instead of sending each file individually, a single concatenated one is delivered using fewer bytes.

On the receive end in aircraft 16, the reverse process is performed in airborne proxy server 19. This is done by decompressing the concatenated files using an inverse transform of the algorithm used to compress files within the ground proxy server 12a. Once the file is decompressed, individual files are located by a header scheme. These files are delivered to a respective IP address, to a client's computer, and accumulated in a browser directory for display.

The file concatenation process 32 and compression process 40 includes a method of regulating concatenated file size and to determine optimal file concatenation size range to optimally develop compression performance while minimizing latency to an Internet user. In other words the concatenated image file size cannot be allowed to get too large, otherwise too much front end latency occurs that is not pleasing to a client who is waiting for a web page to load while browsing the web. Furthermore the concatenated image file size can not be too small or else the compression effectiveness fades. The process may introduce additional latency on small files; however the overall concatenation/compression process improves total bulk download speed is faster than if individual files are sent.

As an example, approximately 700 Kbytes may be found as being optimum for providing a balance between high-compression and low file latency performance. The network operations center 12 may be configured dynamically or in advance to provide the highest system benefit by determining the best file concatenation compression/lowest latency combination by discovery or systematically assessing incoming file combinations. For example, data files arriving from the Internet and available at the NOC 12 may include the following:

file a 500 kb
file b 100 kb
file c 30 kb
file d 10 kb
file e 700 kb
file f 30 kb The concatenation process 32 (see FIG. 2) at the NOC 12 assesses an outcome on all combinations based on calculated latency and compression effectiveness parameters and weighting factors for each with minimum or maximum criteria. The concatenation process 32 in real time concatenates individual files as follows:

file a+file c+file f=new file 560 kb file b+file d+file e=new file 810 kb

Note the process builds new files not excessively outside that of 700 Kbytes as noted earlier as an optimal latency/compression point. The concatenation process 32 automatically accounts for graphics and text file differences in its attempt at each combination of files before deciding on what file set(s) to send over the communications system 10. The concatenation process 32 regulates concatenated file content delivery to the final compression process 40 in FIG. 2.

Even though most files that make up the composite website are generally non-compressible alone, the concatenation of all or most files from a web page and resized according to air-to-ground protocol from the business jet re-introduces data entropy and reduces unnecessary data and therefore a new degree of compressibility.

Short term latency is introduced on some files with the concatenated process 32. However in many cases it is generally faster to compress an entire web page. For example, a graphic file otherwise ready for transport, may be held back for compression and transport with other files. The entire group may still be sent in less time than if all files were individually sent.

Compression opportunities also exist in areas that involve lossy file reduction without significant impact to the quality of an image. These methods as part of the present invention are described below and are applicable to image files only.

Transcoding 30 (see FIG. 2) involves converting an existing JPEG image in the old discrete cosine transform (DCT) standard to JPEG2000 in the more efficient wavelet standard with an estimated savings of approximately 20%. This process induces permanent changes to the file and therefore is considered to be a lossy process.

The de-featuring process 28 involves image fidelity reduction such as chroma and luminance intensity scale reduction to save file size of up to 40%. Chroma and luminance reduction of 20% and 15% respectively still produces high quality images with nearly no detectable quality differences. Chroma and luminance attribute settings may be set to independent fidelity levels. Lower settings require less file data. Files may be de-featured according to the display 19a size used on the aircraft 16. The size of the video display 19a is shared with the NOC 12 proxy server 12a. The proxy server 12a reads a data word sent by the aircraft 16 providing details of the aircraft displays 19a on line 25a. Graphics files are de-featured in process 28 according to this protocol. Information in the picture or graphic is removed from the lossy files according to client display specifications. The client does not notice this reduction. This is shown in FIG. 2 with client screen attribute information data received from the aircraft 16 on line 25a being sent to the de-feature process 28.

Image scaling, data subsampling, decimation, and interpolation involve image scaling and size reduction. Images are reduced in fidelity to just meet aircraft display 19a size needs. Graphics images are decimated and interpolated to more efficiently map the graphic images into smaller display fields typically used with personal electronic devices (PED). A potential of 33% or greater in data reduction is possible while using commercial algorithms. Image scaling and fidelity reduction is a lossy process with low detectibility to the eye. If an image is originally encoded for high fidelity on a 21-inch screen, then a 10-inch screen does not require all of the pixel data, and then some data extraction/interpolation may be performed reducing bandwidth needed over the communications system 10.

An image scaling protocol between the aircraft 16 and ground NOC proxy sever 12a, automatically or manually by a web page survey or questionnaire, communicates the client display 19a size and/or display resolution used on the aircraft 16 to the ground proxy sever 12a. The ground proxy server 12a uses this same information by reading the data word on line 25a sent by the aircraft 16 providing details of the aircraft displays 19a as in de-featuring 28 to subsampling 25 or reprocess graphical information to a reduced resolution while still maintaining the original graphic aspect ratio for accurate size presentation on the client display 19a. This backend subsampling process 25 removes any unnecessary data associated with lossless graphic files that would not otherwise be visible on the client display 19a anyway. This subsampling process 25 may be also be included within the de-featuring process 28 previously discussed for lossy files. Each aircraft client or system can have its own custom bandwidth reduction process based on maximum image size parameters in order to provide custom reduction of air-to-ground data traffic.

In an example of the image scaling process operation, the client display 19a requirements are determined or inferred through communication between the aircraft proxy server 19 and a PED having the display 19a. For example the display 19a may be the PED, a laptop, PDA (personal digital assistant), or a cell phone. The process may include a log-on webpage or welcome page from the server 19, prompting the user for basic device information and enabling quality/speed trade-off.

Next, this display device information (with the assigned IP address) is communicated by air-to-ground radio, to the compression proxy server 12a on the ground. The client display requirements are used to provide graphics compression routines information for the proxy server 12a on how to compress or reduce graphics according to each unique IP address based on the inferred or selected display requirements associated with that address.

For example, JPEG images obtained from a website may have been encoded to a quality level that achieves high standards on a 21" (1600×1200) video monitor (typical office PC). However the client display 19a on the aircraft 16 may only have a 14" (1024×768) XGA. A significant percentage of each image data can be reduced by de-featuring 28 the image to lesser fidelity (while still maintaining relative size and quality) or in some cases simply subsampling 25 and de-featuring 28 the data by the display aspect ratio prior to the ground-to-air transmission. Reconstruction of the image to its proper size for the HTML (webpage) is accomplished in the aircraft proxy server 19 where the inverse compression routines are performed.

The present invention provides an interface and air-ground-air protocol designed to prompt/ask an aircraft client to enable or otherwise provide information that may be used to regulate image quality, or image quality based on client laptop image size. Also a similar interface and protocol process enables the NOC 12 to automatically query an in-flight entertainment system of its client display resolution/sizes for the purpose of regulating image quality to each client display 19a. Furthermore, the invention provides the ability to allow different image quality delivery to each client display 19a in the aircraft 16 enabling custom data reduction methods to be used according to each display 19a. The present invention has the ability to allow the client to regulate the image quality according to their needs. Data reduction of high-resolution images can reduce data by significant amounts further reducing SATCOM and other alternative air-to-ground communications.

It is believed that the SATCOM data compression system and method of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of data compression for compressing a web page comprising the steps of
    storing the web page having graphics files, text files, JAVA scripts, and HTML files in a temporary directory;
    sorting the graphics files into lossless files and lossy files;
    subsampling the lossless files;
    de-featuring the lossy files;
    transcoding the de-featured lossy files;
    concatenating the transcoded and de-featured lossy files, the decimated lossless files, the text files, JAVA scripts, and the HTML files; and
    compressing the concatenated files in a final compression process to yield a compressed web page.

2. The method of data compression for compressing a web page of claim 1 further comprising the steps of:
    obtaining the HTML files from the temporary directory;
    scanning the HTML files for graphics file references; and
    enabling concatenating when graphic files cease accumulating in the temporary directory as indicated by the graphic file references.

3. The method of data compression for compressing a web page of claim 2 wherein the step of enabling concatenating when graphic files cease accumulating in the temporary directory is performed after one of a preset time and some percentage of the files are delivered.

4. The method of data compression for compressing a web page of claim 1 wherein the step of subsampling the lossless files further comprises the step of reducing a graphic image size to match a size and resolution requirement of a client display.

5. The method of data compression for compressing a web page of claim 4 further comprising the steps of:
    communicating the size and resolution requirement of the client display;
    reprocessing the lossless files to a reduced resolution while maintaining an original graphic aspect ratio for accurate size presentation to the client display; and
    removing any unnecessary data associated with the graphic image not visible on the client display.

6. The method of data compression for compressing a web page of claim 1 wherein the step of de-featuring the lossy files further comprises the steps of:
    communicating a size and resolution requirement of a client display; and
    reducing image fidelity of the lossy files according to the display size.

7. The method of data compression for compressing a web page of claim 6 wherein the step of reducing image fidelity further comprises the step of reducing chroma and luminance fidelity.

8. The method of data compression for compressing a web page of claim 6 further comprises the step decimating the lossy files to reduce a graphic image size to match the size of the client display.

9. The method of data compression for compressing a web page of claim 1 wherein the step of transcoding the lossy files further comprises the step of converting an existing discrete cosign transform image to a wavelet image.

10. The method of data compression for compressing a web page of claim 1 further comprising the steps of:
   determining an optimal file concatenation size to optimize compression and minimize latency; and
   regulating concatenated file size to the optimal file concatenation size.

11. The method of data compression for compressing a web page of claim 10 further comprising the step of regulating concatenated file size to approximately 700 Kbytes.

12. The method of data compression for compressing a web page of claim 10 further comprising the step of configuring in real time the web page files in advance by determining the best file concatenation compression/lowest latency combination by discovery or systematically assessing file combinations.

13. A method of data compression for compressing a web page having graphics files, text files, JAVA scripts, and HTML files comprising the steps of:
   storing the graphics files, the text files, the JAVA scripts, and the HTML files in a temporary directory;
   sorting the graphics files into lossless files and lossy files;
   concatenating the lossy files, the lossless files, the text files, the JAVA scripts, and the HTML files; and
   compressing the concatenated files in a final compression process to yield a compressed web page.

14. The method of data compression for compressing a web page of claim 13 further comprising the steps of:
   subsampling the lossless files;
   de-featuring the lossy files; and
   transcoding the de-featured lossy files.

15. The method of data compression for compressing a web page of claim 14 wherein the step of decimating the lossless files further comprises the steps of:
   communicating a client display size and resolution;
   reprocessing the lossless files to a reduced resolution while maintaining an original graphic aspect ratio for accurate size presentation to the client display; and
   removing any unnecessary data associated with the graphic image not visible on the client display.

16. The method of data compression for compressing a web page of claim 13 further comprising the steps of:
   determining optimal file concatenation size range to optimally develop compression performance while minimizing latency; and
   regulating concatenated file size to the optimal file concatenation size.

17. The method of data compression for compressing a web page of claim 14 wherein the step of de-featuring the lossy files further comprises the steps of:
   communicating a client display size and maximum display resolution; and
   reducing image fidelity of the lossy files according to the display size.

18. The method of data compression for compressing a web page of claim 17 wherein the step of reducing image fidelity further comprises the step of reducing chroma and luminance fidelity.

19. The method of data compression for compressing a web page of claim 17 further comprises the step decimating the lossy files to reduce a graphic image size to match the size of the client display.

* * * * *